Figure 1:
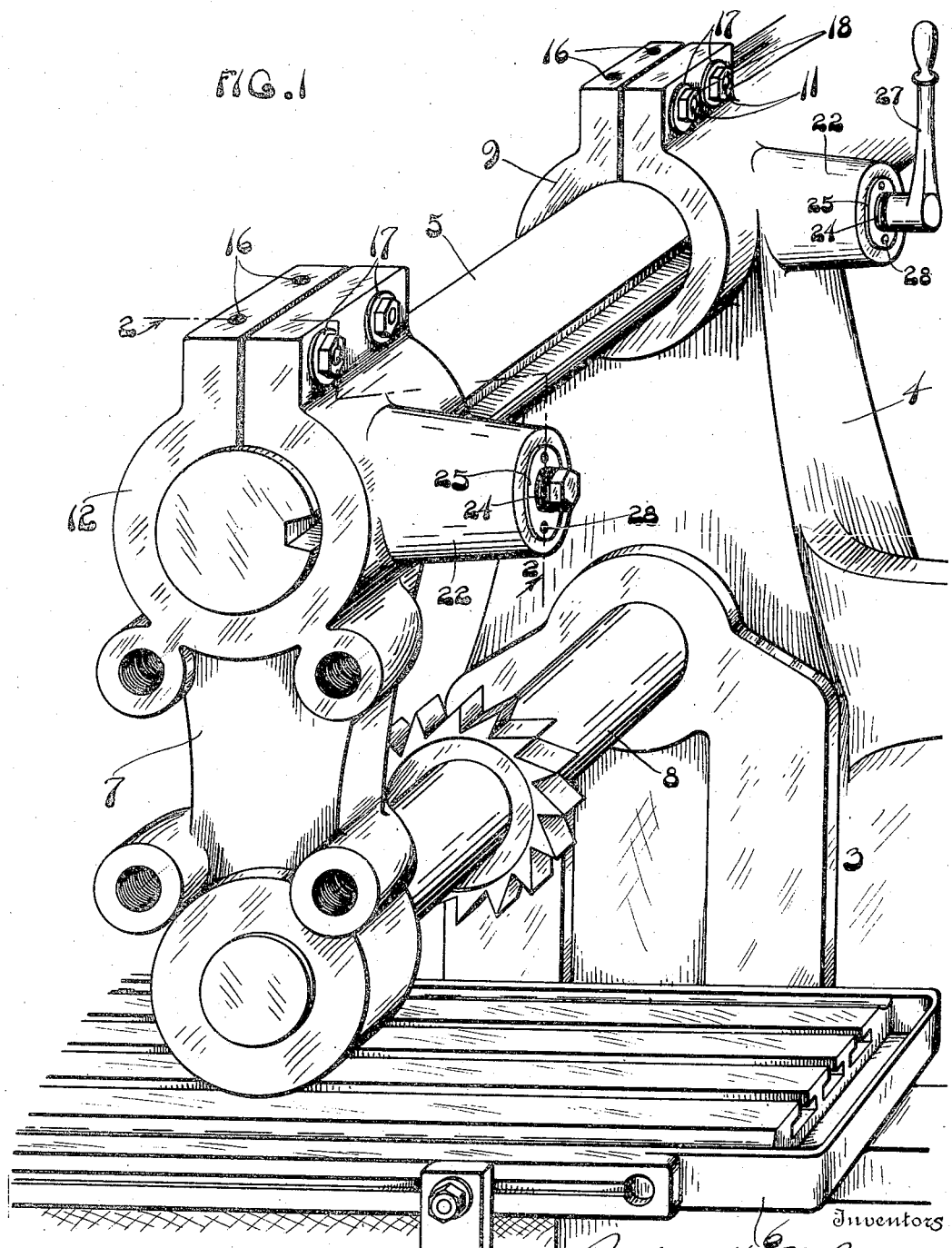

R. K. LE BLOND & W. F. GROENE.
MILLING MACHINE.
APPLICATION FILED MAY 10, 1913.

1,152,030.

Patented Aug. 31, 1915.
2 SHEETS—SHEET 1.

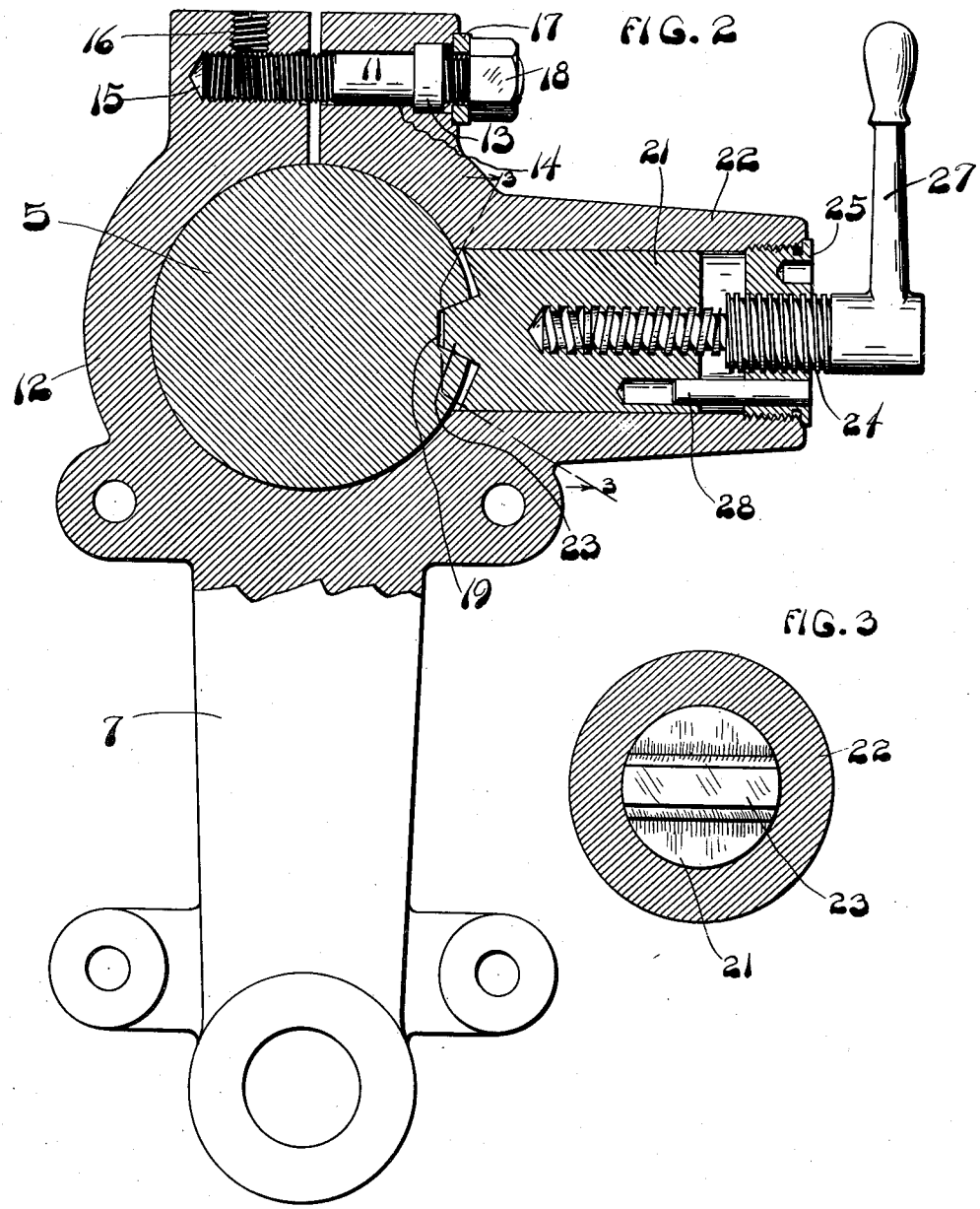

UNITED STATES PATENT OFFICE.

RICHARD K. LE BLOND AND WILLIAM F. GROENE, OF CINCINNATI, OHIO, ASSIGNORS TO THE R. K. LE BLOND MACHINE TOOL COMPANY, OF CINCINNATI, OHIO, A CORPORATION OF OHIO.

MILLING-MACHINE.

1,152,030.  Specification of Letters Patent.  Patented Aug. 31, 1915.

Application filed May 10, 1913.  Serial No. 766,687.

*To all whom it may concern:*

Be it known that we, RICHARD K. LE BLOND and WILLIAM F. GROENE, citizens of the United States of America, and residents of Cincinnati, county of Hamilton, and State of Ohio, have invented certain new and useful Improvements in Milling-Machines, of which the following is a specification.

This invention relates to milling machines and has for an object to produce new and improved means for adjusting the position and clamping of the overhanging arm in place.

A further object is to produce a new and improved means for insuring a proper positioning of the arbor supports on the overhanging arm.

These and other objects we attain in a machine embodying the features herein described and illustrated in the drawings accompanying and forming a part of this application.

In the drawings, Figure 1 is a fragmental perspective view of a machine embodying our invention. Fig. 2 is a sectional view along the line 2—2 of Fig. 1, a portion of the arbor support being shown in elevation for convenience of illustration. Fig. 3 is a cross-section upon irregular line 3—3 of Fig. 2.

The machine illustrated in Fig. 1 includes a frame portion 3 provided with columns 4, on which an overhanging arm 5 is mounted. The machine is provided with the usual work-carrying table 6, and an arbor support 7 is shown mounted on the arm 5 and supporting the end of a cutter-carrying arbor 8. The overhanging arm 5 preferably consists of a substantially cylindrical solid metal bar, which is adjustably mounted in sleeve bearings 9 provided for it on the columns 4 of the machine, and through which the arm is longitudinally movable. The bearings 9 are split, as is customary, and each bearing is provided with clamp bolts 11 which are employed in drawing the two portions of the bearing together for the purpose of adjusting the position of the bearing surface with relation to the peripheral face of the arm 5. The support 7 is also provided with a split bearing 12, which is similar to each of the bearings 9 and which, as shown in Fig. 2, adequately illustrates the construction of the bearings 9. The bolts 11, employed, are especially constructed, so that they are adapted to more or less permanently adjust the bearings to a snug sliding fit, with relation to the arm 5, and also to be employed in drawing the bearings up into gripping engagement with the arm, without affecting the first adjustment of the bolts. This is accomplished by providing screw threads at each end of each bolt and a collar 13 between the screw threaded portions. One portion of each split bearing is, as is customary, provided with an aperture 14, which is of such diameter that a bolt 11 is capable of passing freely through it. The coöperating portion of the split bearing is provided with a tapped aperture 15, which is located in alinement with the aperture 14 and into which a bolt 11 is adapted to be screwed. The outer end of the aperture 14 is counter-sunk to such an extent that the collar 13, when bearing against the shoulder formed by the counter-sinking, is located wholly within the aperture 14 and the threaded portion only of the bolt projects out of the aperture. The operation of adjusting each bolt so that it holds the split bearing in snug sliding engagement with the arm 5 consists in screwing the bolt into the tapped aperture 15, until the collar 13 rests against the shoulder formed by counter-sinking the aperture 14. The bolt is then screwed farther into the aperture 15, until it draws the two portions of the bearing into the desired relative positions, or into positions such that a snug sliding fit is provided between the bearing and the arm 5. The bolt 11 may, if desired, be permanently secured in this position by means of a set screw 16. A washer 17 and a nut 18 are employed for the purpose of drawing the separate portions of the bearing into gripping engagement with the arm 5. The nut 18 is screwed onto the projecting end of the bolt 11 and the washer is located between it and the surface of the sleeve. By screwing up the nut, the bolt operates to force the bearing into more intimate engagement with the arm 5, and at the same time the collar 13 is moved off of its supporting shoulder. It will be apparent that as the nut 18 is unscrewed, the collar will again seat on the shoulder formed by counter-sinking the aperture 14, and will thereby check a further spreading of the bearing; or, in other words, will hold the bearing in a snug sliding fit adjustment with the arm 5.

We have also provided means for positively locking the arm 5 against rotation in its bearings 9 and for positively locking the support 7 against rotation about the arm and also for insuring its proper positioning with relation to the frame of the machine. In the illustrated embodiment of the invention, this is accomplished by providing a longitudinally extending groove 19 in the peripheral face of the arm 5, and by providing coöperating plungers 21 which are adapted to engage the groove and to prevent relative motion between themselves and the arm. As illustrated, the groove 19 is provided with inwardly converging lateral walls, which are inclined equally, with relation to the bottom of the groove, and the bearing 9, adjacent to the overhanging portion of the arm, is provided with one of the plungers 21, which is adapted to engage the groove and to thereby positively lock the arm against rotation, with relation to the frame 3 of the machine, or with relation to its supporting bearings 9. The support 7 is also provided with a plunger 21, which is adapted to engage the groove and to thereby positively lock the support against relative motion around the arm and to also insure its proper positioning, with relation to the frame. The construction and arrangement of the plunger 21, with which the bearing 9 is provided, is similar to that of the plunger located on the support 7, and consequently the plunger mounted on the frame portion of the machine has not been illustrated. As illustrated in Fig. 2, the plunger 21 is cylindrical in form, is located in the cylindrical bore of a boss 22, which, as shown, is integrally formed with the walls of the bearing 12, so that the bore extends through the bearing surface. The plunger 21 is provided at its inner end with a transversely extending rib 23, which is formed with converging lateral walls, located in the same angular relation to each other as the lateral walls of the groove 19 are located with relation to each other. The plunger is carefully formed and is carefully positioned, so that its rib 23 is located immediately opposite to the center of the bearing, with which it coöperates, and it is capable of being moved in either direction, within its inclosing boss, by means of a double threaded screw 24, which extends through a plug 25, screwed into the end of the boss 22. The screw 24 is formed in two diameters and the separate portions are screw threaded in opposite directions. The threads formed on the portion of smaller diameter are preferably left-hand threads, and engage a tapped aperture formed within the plunger 21, while the threads formed on the portion of larger diameter are preferably right-hand threads and engage screw threads formed within the plug 25. With this arrangement, turning the screw 24 not only moves the screw itself transversely of the arm 5, but it also moves the plunger longitudinally along the portion of smaller diameter of the thread. Inasmuch as the screw threads formed on the two portions of the screw 24 extend in opposite directions, the motion of the plunger is more rapid than it would be if a single screw thread were employed, since the effect produced by one set of screw threads is augmented by the other set of screw threads; in other words, the motion of the plunger is the resultant of the motion of the screw transversely of the plug 19, and the motion of the plunger along the screw.

The operation of adjusting the position of the arm 5 and of mounting the support 7 in place and in the proper position, is substantially as follows: The nuts 18 are first loosened for the purpose of breaking the gripping engagement between the bearings 9 and the arm 5. As has been described, the loosening of the nuts 18 does not affect the adjustment of the bolts 11, and consequently the collars 13 of the bolts operate to prevent the sleeve bearings from spreading an unnecessary amount. After the bolts 18 are loosened, the arm 5 is shifted to the desired position and a support 7 is mounted on it, as shown in Fig. 1; it being understood that the nuts 18, on the support, have been loosened for the purpose of expanding the sleeve bearing 12 a sufficient amount to permit it to slip over the end of the arm. After the arm 5 has been moved to the desired position, the screw 24 is turned, by means of a removable handle or socket wrench 27, so that the plunger 21 is moved inwardly and so that its rib 23 is forced into the groove 19 of the arm. The inclined faces of the rib and of the groove coöperate in turning the arm 5 to the proper position and in thereby insuring the proper position of the groove, with relation to the frame portion. After the plunger 21 of the bearing 9 has been clamped against the arm 5, the plunger 21 of the support 7 is clamped against the arm 5, so that its rib 23 engages the groove 19. This insures the proper positioning of the support, with relation to the frame, and also positively locks it against turning about the arm. The bolts 18 can then be tightened for the purpose of drawing the bearing surfaces into gripping engagement with the arm and for thereby increasing the rigidity of the arm and for aiding the plungers 21 in holding the arm and the support in the proper positions. It will be understood that the arbor 8 will be journaled on the support 7 in the customary manner, and that if desired, the usual knee braces may be secured to the support 7. It will also be understood that, if desired, more than one of the supports 7 may be employed on the overhanging arm, and that each support may be provided with a positioning plunger 21, for engaging the groove 19.

In the operation of removing the support from the arm 5, the screw 24, with which the arm is provided, is turned so as to move the plunger 21, mounted on the support, outwardly and to thereby withdraw the rib 23 from engagement with the slot. The bolts 18 can then be loosened and the support removed. Each plunger 21, is confined within its mounting bore by means of the plug 25, and it is guided in its motion through the bore by means of a pin 28, which projects through and is secured to the plug. The plug is capable of being screwed into the boss 22 by means of a spanner wrench, and the plunger will turn with it when its rib 23 is moved free of the arm 5. With this construction the plunger can be inserted into, and removed from, its bore.

In accordance with the United States patent statutes we have described what we now consider as the preferred embodiment of our invention, but we desire it to be understood that various changes, modifications, substitutions, additions or omissions may be made to the apparatus illustrated, without departing from the spirit and scope of our invention, as set forth by the appended claims.

What we claim is:

1. In combination in a machine of the character described, a split sleeve bearing, means adapted to adjust said bearing to a sliding fit and means engaging the first-mentioned means, and adapted to adjust the bearing to a clamping fit without varying the adjustment of the first-mentioned means.

2. In combination with the overhanging arm in a milling machine, a positioning plunger for engaging the arm, and an oppositely threaded screw for adjusting the position of said plunger, one set of threads engaging the plunger and the other set engaging a relatively stationary member, through which the screw extends.

3. In a machine of the character described, an overhanging arm, a bearing for the arm located on the frame of the machine, means mounted on said bearing, adapted to lock said arm against rotary movement relatively to the bearing, bolts mounted on said bearing, adapted to secure sliding adjustment of the arm relatively to the bearing, and means mounted on the bolts adapted to lock the arm against longitudinal movement relatively to the bearing without disturbing the adjustment of the bolts and after the first mentioned means has been brought into operation.

4. In a machine of the character described the combination of a frame having a split bearing, an overhanging arm mounted in the bearing and having a longitudinal slot with tapered sides, means adapted to adjust the bearing to a sliding fit with the arm and a plunger mounted in the bearing and having a tapered end adapted to engage the slot to center the arm in its bearing, and means for clamping the bearing upon the arm.

5. The combination of a split sleeve having a screw-threaded bore at one side of the split and a bore in alinement with and of larger diameter than said bore and upon the other side of the split, and a bolt having a screw-threaded portion at each of its ends and a collar intermediate its ends, one of said screw threaded portions engaging said screw-threaded bore and the other sliding in the enlarged bore and a nut engaging the other screw-threaded end of the bolt and adapted to have a bearing upon the exterior of the sleeve.

In testimony whereof we have hereunto subscribed our names this 1st day of May, 1913.

RICHARD K. LE BLOND.
WILLIAM F. GROENE.

Witnesses:
   FRED LE BLOND,
   GRACE PUGH.